United States Patent [19]

Kalvenes et al.

[11] 4,197,077

[45] Apr. 8, 1980

[54] APPARATUS FOR USE IN MANUFACTURING OF CELLULAR LIGHTWEIGHT CONCRETE SLABS

[75] Inventors: Øystein Kalvenes, Grödinge; Gösta H. Eriksson, Södertälje; Percy Svensson, Rönninge; Rolf E. Göransson, Åkarp, all of Sweden

[73] Assignee: Internationella Siporex AB, Malmo, Sweden

[21] Appl. No.: 870,797

[22] Filed: Jan. 19, 1978

Related U.S. Application Data

[62] Division of Ser. No. 624,078, Oct. 20, 1975, Pat. No. 4,083,908.

[30] Foreign Application Priority Data

Oct. 31, 1974 [SE] Sweden ................................ 7413713

[51] Int. Cl.[2] .............................................. C04B 15/24

[52] U.S. Cl. ................................ 425/305.1; 425/297; 425/308; 83/94; 83/152; 83/651.1; 83/870; 29/565

[58] Field of Search .................... 83/4, 94, 152, 651.1, 83/870–874; 29/565; 214/6 FS; 264/DIG. 57, 158, 157

[56] References Cited

U.S. PATENT DOCUMENTS

| | | | |
|---|---|---|---|
| 2,800,932 | 7/1957 | Scott | 83/5 |
| 2,821,254 | 1/1958 | Kernen | 83/4 |
| 3,031,906 | 5/1962 | Holman | 83/94 |
| 3,695,129 | 10/1972 | Urijma | 83/152 X |
| 3,836,018 | 9/1974 | Dawson et al. | 214/6 P |

FOREIGN PATENT DOCUMENTS

| | | | |
|---|---|---|---|
| 2112042 | 3/1971 | Fed. Rep. of Germany | 83/870 |

*Primary Examiner*—J. M. Meister
*Attorney, Agent, or Firm*—Fred Philpitt

[57] ABSTRACT

Cellular lightweight concrete slabs are manufactured by cutting a still plastic block of cellular concrete mass resting on a first support horizontally into slices which are then moved over one by one to a second support and piled in reversed order thereon, at least one of the two broadsides of each body slice being subjected to a treatment before being covered by the next transferred slice. The treatment prevents the body slices from cementing together during the subsequent steam-hardening process and may also improve the quality of the slabs when hardened. An apparatus for each manufacture features a movable suction head for transferring the body slices as well as associated means for cutting and treating said slices.

5 Claims, 11 Drawing Figures

APPARATUS FOR USE IN MANUFACTURING OF CELLULAR LIGHTWEIGHT CONCRETE SLABS

RELATED APPLICATION

Figure 1:
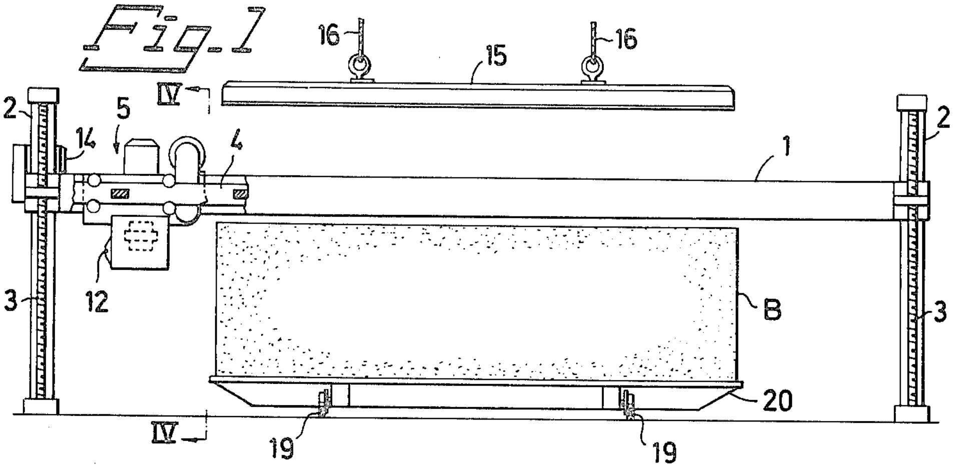

This application is a division of our prior application Ser. No. 624,078 filed 10/20/75, (now U.S. Pat. No. 4,083,908, issued 4/11/78) and the benefits of 35 USC 120 are claimed relative to this prior application.

Within the cellular lightweight concrete industry it has for a long time been used a method of manufacturing cellular lightweight concrete products that comprises the steps of first molding a large, cellular and at least approximately parallelepipedic body from a concrete mass, which in a given stage after molding is plastic but nevertheless self-supporting so that it does not need the support of the mold walls any more, subsequently dividing said body, when it is resting on a first support and while the concrete mass thereof is still plastic, by horizontal cuts into a plurality of slab-like slices, each of which has a thickness that is substantially less than the original height of the body, and finally steam-hardening a plurality of the slab-like slices thus obtained as a group in an autoclave, while they are rested one on top of the other to form a pile.

This manufacturing method has many advantages but is not entirely free of problems, and the most dominant one of them is that the slab-like slices frequently show a great tendency of binding or cementing together during the steam-hardening process, so that they afterwards must be separated from each other by force, in which case the products can easily be damaged. This cementing results from the fact that the concrete material on the facing broadsides of the piled body slices, i.e. the recently cut, horizontal surfaces thereof, because of the plastic character of the concrete mass and other circumstances will show a tendency to again coalesce with one another at least in spots here and there after the passage of the cutting members, by means of which the cuts have been produced, and during the steam-hardening process this junction between the piled slices will then be considerably strengthened and form an unacceptly firm bond.

It is known that such cementing can be counteracted at least to some extent by changing the composition of the concrete mass, but frequently a change of the concrete mix formula cannot be resorted to for various reasons. It is also known that such cementing can be reduced by deferring the cutting of the body to a time, when the solidification of the concrete mass has advanced so far that very little of its plasticity remains. However, from a productional point of view this is very undesirable, because then the total manufacturing process will be very time-consuming and, in addition, the cutting operation proper will become much more difficult. Instead it is desirable that cutting of the body can be carried out as soon as possible after the body-forming concrete mass has become self-supporting but is still rather soft, because this will shorten the total production time not only by reducing the preparation time before cutting to a minimum but also by permitting the accomplishment of the cutting operation proper at a maximum speed. The fact is that it is rather unimportant both to the required steam-hardening time and to the quality of the finished product what consistency the product-forming mass actually has at the beginning of the steam-hardening process.

The primary object of this invention is to teach an improved way of preventing the beforementioned cementing together of adjacent body slices, when cellular concrete products are manufactured according to the method referred to hereinbefore, without therefor resorting to possible changes of the composition of the concrete mass or to an extended time for the mass to solidify before cutting. In addition, the invention has for its object to provide a suitable apparatus for carrying out the improved method.

Accordingly, the invention primarily suggests the improvement of the method of manufacturing cellular lightweight concrete products referred to hereinbefore which consists in that one slab-like slice at the time is lifted away from the remainder of the body resting on the first support and transferred to a second support, on which the slices thus received are piled in reversed order, one on top of the other, and that at least one of the every two broadsides of adjacent pairs of slab-like slices, which will be facing each other in the pile on the second support, is subjected to a treatment that will at least reduce the risk of the occurence of a firm binding between the piled body slices during the steam-hardening process.

Secondarily the invention relates to an apparatus for carrying out the improved manufacturing method and featuring in combination a first support for the body, a substantially rectangular, horizontal frame structure that is at least vertically movable relative to said first support and includes longitudinally extending running rails, at least one carriage reciprocatable along said rails of the frame structure and carrying means operable to work a part of the body at a time, a second support for receiving a pile of slices from the body on the first support, and a suction head that is vertically and horizontally movable relative to said first and second supports for transferring the body slices one by one between them.

Using the improved method according to this invention will not only solve the beforementioned cementing together problem but will also offer extraordinary and valuable possibilities for additional surface treatment of the slab-forming body slice already before the steam-hardening process. Accordingly, the invention opens new ways for a rational application of various surface treatment and surface working operations, which may give the products any desired appearance and any desired surface qualities.

Figure 2:
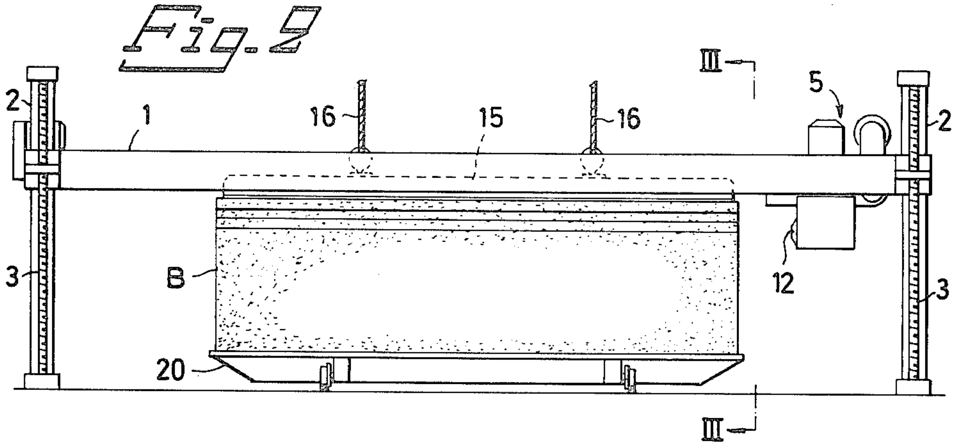
Figure 3:
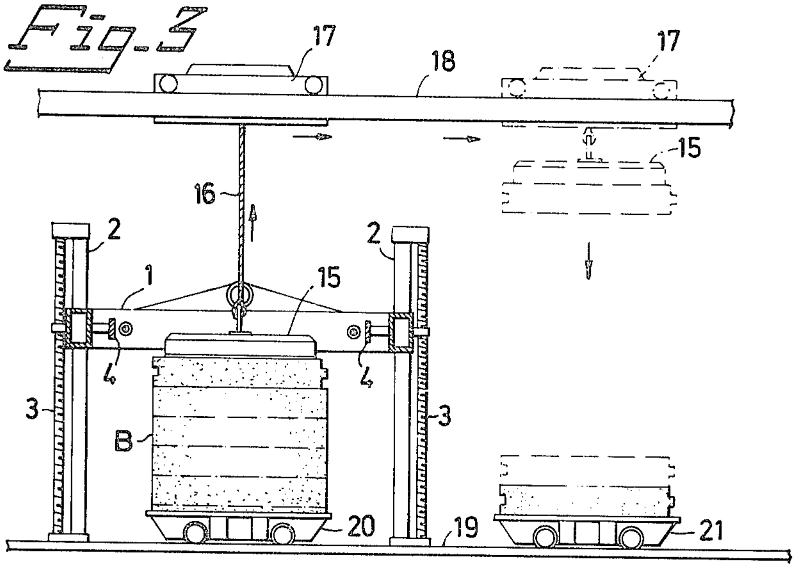
Figure 4:
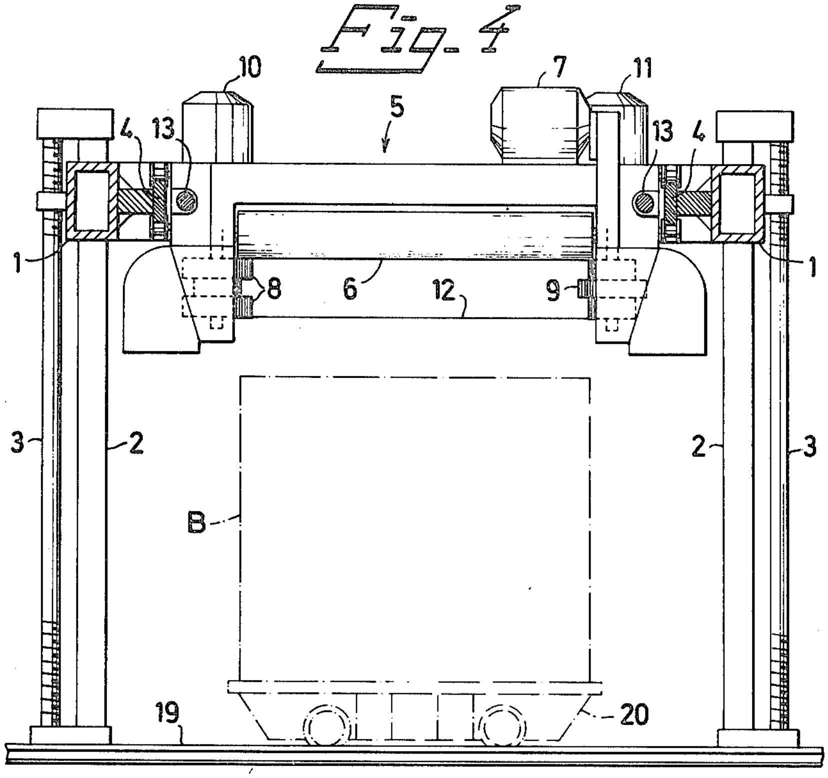
Figure 9:
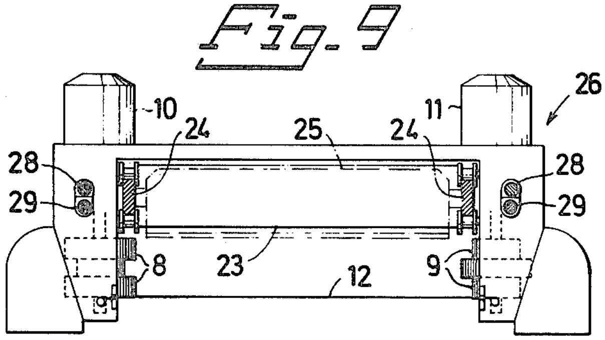
Figure 10:
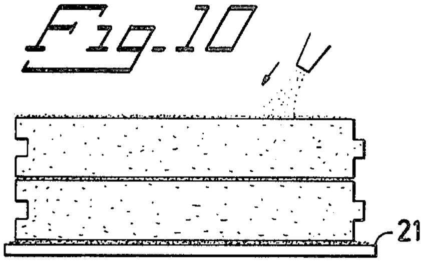
Figure 11:
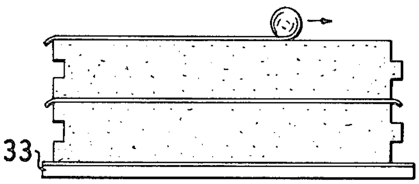
Figure 5:
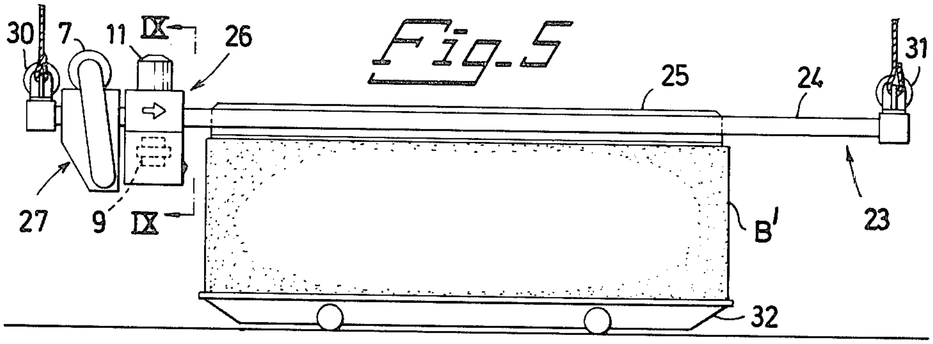
Figure 6:
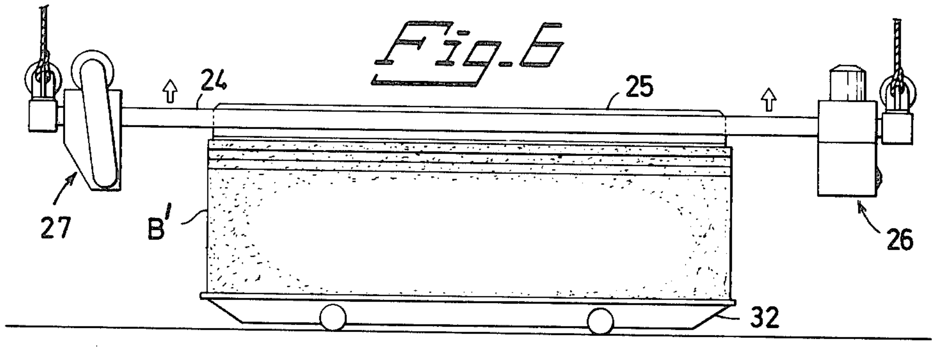
Figure 7:
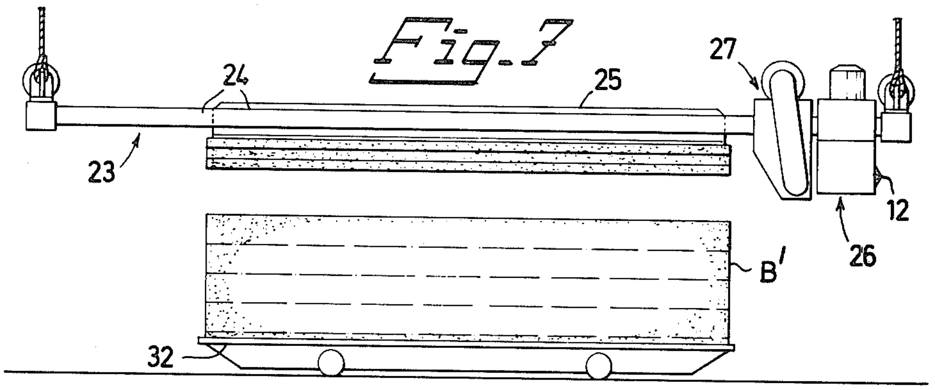
Figure 8:
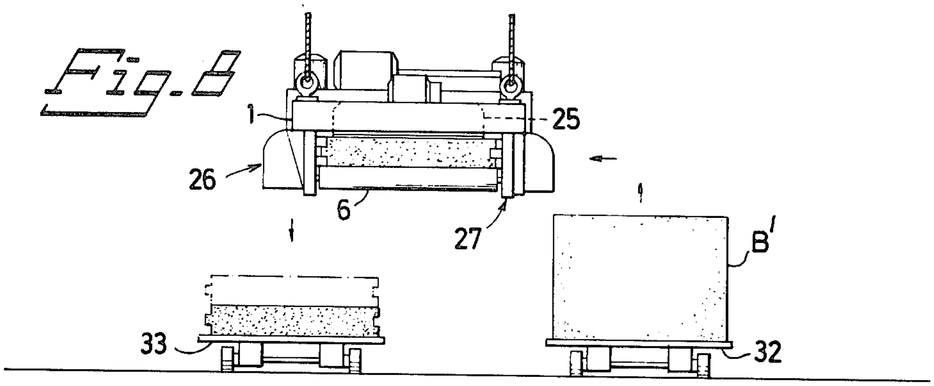

For further elucidation of the invention some examples of its application will be described in the following and with reference to the accompanying drawings. In the drawings:

FIG. 1 is a side elevation of a first form of apparatus for carrying out the improved method, a parallelopipedic and cellular body of still plastic concrete mass being introduced into the apparatus and the parts of the latter occupying their starting positions, FIG. 2 is a similar side elevation of the same apparatus as in FIG. 1 but showing the parts thereof when a first operational step has just been carried out, FIG. 3 is a sectional elevation of the same apparatus as seen from the line III—III in FIG. 2, FIG. 4 is an enlarged sectional elevation as seen from the line IV—IV in FIG. 1, FIG. 5 is a side elevation of a modified form of apparatus for carrying out the method according to the invention, this apparatus resting on top of a still plastic, substantially parallelopipedic cellular concrete body that is about to be divided into slab-like slices, FIG. 6 is a similar side elevation of the apparatus in FIG. 5 showing the parts thereof in their positions after a first operational step has been accomplished, FIG. 7 is a similar side elevation of the modified apparatus showing the parts thereof when two further operational steps have been accomplished, FIG. 8 is an end view of the modified apparatus as soon from the left in FIG. 7, FIG. 9 is an enlarged sectional elevation of the modified apparatus as seen from the line IX—IX in FIG. 5, FIG. 10 is a simplified illustration of a first manner of applying a surface covering layer to a slab-like body slice that has just been deposited on a second support and is about to receive on top of it a further body slice, and FIG. 11 is a similar simplified illustration of another manner of covering a slab-like body slice received on a second support, before the next body slice is added to the pile.

In FIGS. 1–4 numeral 1 designates a horizontal, generally rectangular, open frame structure that is vertically movable along stationary guiding posts 2, one at each corner, by means of vertical screws 3, which are synchronously rotatable by means of a driving mechanism, not shown but including, for instance, a motor and chain transmissions. The longitudinal side members of the frame 1 have on their inner sides running rails 4 for a kind of carriage generally designated by 5, the construction of which will best appear from FIG. 4. This carriage 5 carries at its front a horizontal roller 6 driven by a motor 7 and having for its task to effect under rapid rotation a smoothing and compacting of the top surface of a still plastic cellular lightweight concrete body B, with which it is brought into contact. Furthermore, the carriage 5 carries two edge cutting tools 8 and 9 rotating about vertical axes and driven by each one motor 10 and 11, respectively, these tools having for their task to profile the longitudinal edges of an upper slab-like part of the body B, along which the carriage 5 is caused to move. Finally the carriage 5 carries at its back between suitable holder means a cutting wire 12, which is tightly but resiliently yieldably stretched in a horizontal plane that is parallel to the roller 6 and is at the same level as the lowermost active portions of the rotary cutting tools 8 and 9. The carriage 5 is moved along the running rails 4 by a pair of driving screws 13 journalled in the frame 1 and driven synchronously by means of a common motor 14.

To the apparatus of FIGS. 1–4 also belongs a gripping and lifting implement in the form of a suction head 15, which by means of ropes 16 is vertically movably supported by a crab 17 (FIG. 3) that is movable in the lateral direction of the apparatus along fixed races 18 attached, for instance, to the ceiling of the room, in which the apparatus is installed. The apparatus also includes a pair of rails 19 permitting movement of elongate platform trucks 20 and 21, respectively, through the apparatus in a direction coinciding with the direction of movement of the crab 17. The platform trucks 20 and 21 are suitably identical and have a platform size that is adapted to the bottom area of the parallelepipedic body B that is to be treated and worked. However, from the beginning one truck 21 is empty and positioned a small distance laterally outside the apparatus, whereas the cellular lightweight concrete body B is introduced into the apparatus resting on the other truck 20. The truck 21 may suitably be a truck that has earlier been used for carrying a body but which in the next foregoing cycle of operation has been emptied of its entire load.

When the plastic body B is introduced into the apparatus, the frame 1 must, of course, be kept elevated into such a position that it does not prevent the introduction of the body into the position shown in FIGS. 1 and 3, where the body-carrying truck 20 is locked in any suitable manner. After that, the frame 1 is lowered to a suitable level for a first operation. All the time the suction head 15 is in an elevated, inoperative position as shown in FIG. 1. A first preparatory step, if at all needed, may consist in that the carriage 5 is moved from its starting position in FIG. 1 to its opposite end position shown in FIG. 2 with the cutting wire 12 passing at a level which is only slightly below the original top surface of the body B, so that a relatively thin surface layer is cut loose therefrom. This surface layer can then, by means of the suction head 15, be lifted away and transported to a suitable delivering place for waste material. However, such a preparatory cutting step has only for its purpose to give the top surface of the body a satisfactory smoothness and does not always need to be done.

When the carriage 5 after such a possible preparatory operation has been returned to its starting position shown in FIG. 1, the frame 1 is lowered to such a level that the lowermost side of the roller 6 is a small distance, e.g. some millimeter, below the clean-cut top surface of the body B. After the roller 6 and the cutting tools 8 and 9 have been brought to rotate rapidly, the carriage 5 is again moved from the position shown in FIG. 1 to the position shown in FIG. 2, and during this movement the roller 6 will smooth the top surface of the body, while at the same time the cutting tools 8 and 9 will work, profile and calibrate an upper slab-like part of the body, which part is immediately separated as a slice from the remainder of the body by means of the cutting wire 12. When the carriage 5 has passed, the suction head 15 is lowered into contact with the top side of this separated, slab-like slice of the body B, as shown in FIG. 2, whereupon the interior of the suction head is evacuated in a manner known per se in order to let the suction head adhere to the body slice just separated. After that, the suction head 15 is lifted together with the retained body slice which is transferred to the truck 21 as illustrated in FIG. 3. In this manner the body parts or slices are worked, separated and lifted away one by one from the body B and transferred to the truck 21, where they are again piled, one on top of the other, in reversed order.

By the rolling and smoothing of every new top surface of the body B, and thus of every slice to be removed therefrom, there is achieved not only a compacting of the surface layer giving the suction head 15 a better and more secure grip during its lifting away of the slab-like body slices, but also a change of the surface character on the broadside of the slab-like slice, which, surprisingly enough, has been found to considerably reduce the cementing together of the body slices, when the latter are subsequently piled on the second truck 21. This cementing-preventing surface treatment can frequently be fully sufficient to make a separation of the slab-forming slices in the pile on the truck 21 very easy after the steam-hardening process, for instance if the composition of the concrete mass is such that the cementing tendency is moderate already from the beginning. On the other hand there are also extremely good possibilities for a further improvement of the cementing-preventing effect, as will appear from the following.

Although it is advantageous to use the apparatus shown in FIGS. 1–4 in such a manner that the carriage 5 after each completed operating step, i.e. each stroke from the left to the right, is returned to its starting position, when the recently separated body slice has been lifted away by means of the suction head, inasmuch as the smoothing and the edge cutting operation in such a case will take place before each slice is entirely freed from the remainder of the body B, there is basically nothing preventing the carraige 5 from being operative when moving in both directions, i.e. when moving from the left to the right as well as when moving from the right to the left in FIGS. 1 and 2, and this, of course, will result in an acceleration of the operation of the apparatus.

Actually, it is also possible to apply a modified procedure, in which all the horizontal cuts in the cellular lightweight concrete body B have been made already before the body is introduced into the apparatus shown in FIGS. 1–4, in which case the cutting wire 12 is removed from the carriage 5 and only the roller-smoothing and edge cutting operations are carried out by means of the carriage 5. The preparatory horizontal cutting of the body may then be carried out by means of a cutting device of a kind well known per se and including a plurality of cutting wires stretched horizontally at different levels.

It should be clear that, in using the apparatus according to FIGS. 1–4, the level of the frame 1 must be changed after each operating step and be adjusted with a rather great accuracy. On the other hand the suction head 15 is operating entirely independently when lifting away and transferring the slab-like body slices, and each such slice will be smoothed on its upwardly facing side, before it is subsequently piled on the second support represented by the truck 21. In certain cases this may be found advantageous. However, if it is desirable to avoid the repeated level adjustment, an apparatus as illustrated in FIGS. 5–9 may be used instead.

The modified apparatus of FIGS. 5–9 comprises likewise a substantially rectangular, horizontal frame structure generally designated by 23, the longitudinal side members 24 of which form a pair of parallel running rails 24 rigidly connected to an intermediate suction head 25 serving as a gripping implement, said suction head having almost the same horizontal dimensions as the top face of the cellular lightweight concrete body B' to be worked. The running rails 24 extend in the longitudinal direction a considerable distance beyond both ends of the suction head 25 in order to give sufficient room on either side thereof for two separate carriages 26 and 27, respectively, of which one, 26, in the same manner as the carriage 5 in the preceding example carries rotary edge cutting tools 8 and 9 with related driving motors 10 and 11, respectively, as well as a horizontally stretched cutting wire 12, but has no roller. Instead such a smoothing and compacting roller 6 is together with its driving motor 7 carried by the separate carriage 27, the smoothing roller being in this case positioned with its uppermost face portion at a level that is a small distance, e.g. some millimeter, above the cutting wire 12 on the carriage 26. The two carriages 26 and 27 are individually movable along the running rails 24 by means of each one pair of driving screws 28 and 29, respectively, which are synchronously driven in pairs by each one motor 30 and 31, respectively, located at opposite ends of the frame structure 23. The entire frame structure 23 together with the suction head 25 is, by means of ropes 32, vertically adjustably supported by a crab, not shown.

The manner of operation of the modified apparatus is as follows: the frame structure 23 is lowered over the plastic cellular lightweight concrete body B' resting on a truck 32 to let the suction head 25 come to rest on top of the body as shown in FIG. 5. The carriage 26, which is formed in such a manner that it can straddle the suction head 25 and thus pass freely over the same, is now moved from the left to the right and has, after having completed its full stroke as shown in FIG. 6, but off a slab-like part or slice from the body B' and also profiled the longitudinal edges of said body slice. When this first operational step has been completed, the interior of the suction head 25 is evacuated, if this has not been done already, and the frame structure 23 is lifted, the adhering body slice following it and being thus lifted away from the remainder of the body B'. When the frame structure has been lifted up to a sufficient level, or has been moved laterally after a limited lifting movement as shown in FIG. 8, the second carriage 27 is caused to move, after its smoothing roller has first been brought to rotate, the carriage 27 being also moved from the left to the right (FIGS. 6 and 7) without obstruction from the suction head 25, which also the carriage 27 is straddling with a free play. During this movement the bottom side of the lifted slice just removed from the body B' and carried by the suction head 25 is compacted and smoothed, and immediately afterwards the body slice thus treated is deposited on a second truck 33, on which possibly a previously transferred body slice is already resting with its one broadside that is only wire-cut facing upwards. However, before the new body slice is deposited on top of the previous one, the wire-cut surface of the latter may be subjected to a further treatment for various purposes, one of which being to further reduce any cementing tendency between the adjacent slab-like body slices in the pile. The decribed operating steps are repeated, until the entire cellular lightweight concrete body B' has been divided into slices and possibly only a thin rest layer of concrete mass remains on the platform of the truck 32.

As already mentioned the surface smoothing and surface compacting effects produced by the roller 6 either on the top side or the bottom side of the body slices, which one by one are lifted away from the remainder of the original body B, or B', and transferred to the second support to be piled thereon, results in a remarkable reduction of the tendency of the slab-like body slices to adhere or bind firmly to each other after having been steam-hardened on the second support. However, the surface smoothing and compacting operations can be replaced as well as supplemented by other procedures aiming towards a further reduction of the cementing tendencies. These other procedures may include covering at least one of the two facing broadsides of two adjacent piled body slices with a separating layer which is capable of remaining unchanged during the steam-hardening process and which does not show any tendency of adhering to the cellular concrete surfaces. Such a separating covering layer may be provided by distributing a release agent over at least one of those two broadsides of two adjacent slices which will be facing ech other upon piling. As such a release agent there may be used a finely comminuted, solid material that remains unaffected by the steam-hardening conditions, such as talcum, silica, limestone, or an already hardened cellular concrete material. The release agent may have a particle size of up towards 5 millimeters and can be strewn, thrown or blasted out on the surface in question, but it is also possible to use a more finely graded release agent material in air or water suspension, which is then spread over the slice surface in question. An example of this is illustrated diagrammatically in FIG. 10, from which it also clearly appears, how the release agent forms a separating layer between the piled body slices on the second support.

As an alternative, a corresponding separation may be obtained by spreading out a continuous, prefabricated layer of the group comprising sheet, foil, fabric, plate, net, felt, or the like between the body slices in the pile to be steam-hardened, as is illustrated in FIG. 11.

It should be clear that it is very advantageous that each slab-like body part or slice when being transferred to and piled on the second support will have its one broadside entirely exposed during a relatively long period of time, in which miscellaneous surface treatment operations including such ones having other purposes than merely to prevent cementing during the steam-hardening process, may be carried out. Thus, each slab-forming body slice may during this stage of the manufacturing process first be provided with an adhering surface coating, before steps are taken to prevent cementing. The adhering surface coating may, in a manner known per se, be built up by granular material that is distributed over and possibly pressed into the cellular concrete surface to be anchored to or in the latter during the steam-hardening process. Also paste-like compositions, possibly on a plastics basis, may be spread out over the surface to adhere thereto. Alternatively, plate- or sheet-like surface coverings, for instance certain types of asbestos-cement sheets, may be inserted in pairs between the piled body slices resting on the second support in order to become bonded to each one of two adjacent body slices during the steam-hardening process without therefore binding together mutually. Many different variants are thus feasible in the application of the basic inventive idea.

What we claim is:

1. An apparatus for manufacturing cellular light weight concrete slabs from a plastic, self-supporting and at least approximately parallelepipedic body of cellular concrete mass and for arranging said slabs in a manner suitable for subsequent steam-hardening thereof, said apparatus comprising in combination: a first support for the body, a substantially rectangular, horizontal frame structure that is at least vertically movable relative to said first support and includes longitudinally extending running rails, at least one carriage reciprocatable along said rails of the frame structure and carrying means for horizontally cutting said body while resting on said first support to form slab-like slices extending over the entire width and length of said body, a second support for receiving slices from the body on the first support, a suction head that is vertically and horizontally movable relative to said first and second supports for transferring the slices one by one from the remainder of the body to the second support and piling the slices in reverse order on said second support, and means for treating at least one horizontal surface of each slice in a manner to at least substantially reduce adherence between the slices piled on said second support.

2. An apparatus according to claim 1 wherein said frame structure is supported by and vertically adjustable in relation to a number of stationary posts, and wherein the suction head is movable independently of the frame structure.

3. An apparatus according to claim 1 wherein said frame structure is rigidly connected to said suction head in order to be supported thereby on top of the cellular light weight concrete body, the frame structure forming with the suction head a unit that is vertically and horizontally movable relative to said first and second supports.

4. An apparatus according to claim 1 wherein said treating means includes means for smoothing the upper surface of each slice prior to bringing the suction head into engagement therewith.

5. An apparatus according to claim 1 wherein said cutting means comprises a horizontal cutting wire and wherein said at least one carriage carries means for working both longitudinal edges of the slab-like slices while resting on the remainder of said body.

* * * * *